(12) United States Patent
Hayashi et al.

(10) Patent No.: US 8,643,782 B2
(45) Date of Patent: Feb. 4, 2014

(54) IMAGE DISPLAY DEVICE AND METHOD FOR DISPLAYING AN IMAGE

(75) Inventors: Yoshihito Hayashi, Matsumoto (JP); Daisuke Kasahara, Shiojiri (JP); Takashi Nagumo, Yamagata-mura (JP); Susumu Takatsu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/353,946

(22) Filed: Jan. 19, 2012

(65) Prior Publication Data
US 2012/0188447 A1 Jul. 26, 2012

(30) Foreign Application Priority Data
Jan. 24, 2011 (JP) ................................. 2011-011685

(51) Int. Cl.
 *H04N 7/00* (2011.01)
 *H04N 5/445* (2011.01)
 *H04N 5/50* (2006.01)

(52) U.S. Cl.
 USPC ............ 348/521; 348/552; 348/563; 348/569

(58) Field of Classification Search
 USPC .................................. 348/521, 563, 569, 552
 See application file for complete search history.

(56) References Cited

U.S. PATENT DOCUMENTS

| | | | | |
|---|---|---|---|---|
| 5,670,972 | A * | 9/1997 | Kim ................................. | 345/13 |
| 6,654,065 | B1 * | 11/2003 | Sung ............................ | 348/525 |
| 7,596,188 | B2 * | 9/2009 | Gotanda et al. ............... | 375/316 |
| 7,667,774 | B2 * | 2/2010 | Murakami .................... | 348/500 |
| 7,701,512 | B1 * | 4/2010 | Woodall et al. ............... | 348/526 |
| 2002/0060676 | A1 * | 5/2002 | Kim ........................... | 345/212 |
| 2005/0081255 | A1 * | 4/2005 | Kim ............................... | 725/147 |
| 2006/0077298 | A1 * | 4/2006 | Gotanda et al. ............... | 348/558 |
| 2006/0125959 | A1 * | 6/2006 | Yoshizawa et al. ............ | 348/569 |
| 2007/0038786 | A1 * | 2/2007 | Lee ................................ | 710/62 |
| 2008/0138032 | A1 * | 6/2008 | Leyendecker et al. .......... | 386/66 |
| 2009/0051816 | A1 * | 2/2009 | Ota ............................... | 348/618 |
| 2009/0167366 | A1 * | 7/2009 | Wang ........................... | 327/105 |
| 2009/0196340 | A1 | 8/2009 | Tsukada | |
| 2010/0149413 | A1 * | 6/2010 | Kumakawa ................... | 348/447 |
| 2010/0253840 | A1 * | 10/2010 | Nave ............................ | 348/500 |
| 2010/0302447 | A1 * | 12/2010 | Shirai ........................... | 348/607 |
| 2011/0010666 | A1 * | 1/2011 | Choi ............................ | 715/810 |
| 2011/0030007 | A1 * | 2/2011 | Cho ............................. | 725/40 |
| 2011/0126159 | A1 * | 5/2011 | Ko et al. ........................ | 715/848 |
| 2011/0228165 | A1 * | 9/2011 | Nishio .......................... | 348/441 |
| 2012/0050238 | A1 | 3/2012 | Kasahara et al. | |
| 2012/0050239 | A1 | 3/2012 | Kasahara et al. | |
| 2012/0063637 | A1 * | 3/2012 | Tardif ........................... | 382/103 |
| 2012/0169933 | A1 * | 7/2012 | Lee et al. ...................... | 348/563 |
| 2012/0229599 | A1 * | 9/2012 | Fukuyama ..................... | 348/42 |

FOREIGN PATENT DOCUMENTS

| | | |
|---|---|---|
| JP | 2007-140180 A | 6/2007 |
| JP | 2012-047842 A | 3/2012 |
| JP | 2012-047843 A | 3/2012 |

\* cited by examiner

*Primary Examiner* — Brian Yenke
(74) *Attorney, Agent, or Firm* — ALG Intellectual Property, LLC

(57) ABSTRACT

An image display device including a receiving section acquiring a synchronizing signal superimposed on a digital signal, an image generating section outputting image data based on a digital signal, a control section controlling the image generating section, an adjusting section making an adjustment to the digital signal based on setting information, and an information inputting section to which a display instruction to display a setting image for assisting the change of the setting information is input, wherein the image generating section generates a second synchronizing signal different from the first synchronizing signal, and the control section controls the image generating section.

6 Claims, 8 Drawing Sheets

IMAGE DISPLAY DEVICE AND METHOD FOR DISPLAYING AN IMAGE

BACKGROUND

1. Technical Field

The present invention relates to image display devices and methods for displaying an image.

2. Related Art

In a state in which an external device such as a DVD player and an image display device such as a projector are connected via a digital signal cable such as an HDMI® cable, malfunctions such as a state in which an image is not displayed at all, a flicker in an image, and noise in part of an image occur due to various factors. In particular, in case a long HDMI cable is used, the signal quality of the cable or a connected apparatus determines whether an image can be displayed or not. JP-A-2007-140180 is an example of related art.

The above-described problems can be solved by changing the equalizer setting. However, when an equalizer is adjusted, a jump occurs also in OSD display. This sometimes makes it impossible to even display an equalizer adjustment menu.

SUMMARY

An advantage of some aspects of the invention is to provide an image display device and a method for displaying an image that can solve the problems described and appropriately make an adjustment to a digital signal which is input via a digital signal cable. The device and the method can display an OSD adjustment menu and make optimum equalizer setting while checking a menu screen by releasing a lock applied by a vertical synchronizing signal from an external input and performing panel drive based on a vertical synchronizing signal which is generated in the image display device in equalizer adjustment mode.

The invention can be implemented as the following forms or application examples.

An image display device according to an application example includes: a receiving section that acquires a synchronizing signal superimposed on a digital signal which is input and outputs a first synchronizing signal; an image generating section that outputs image data based on the digital signal; a control section that controls the image generating section so that the image generating section outputs the image data in synchronization with the first synchronizing signal; an adjusting section that makes an adjustment to the digital signal based on setting information; and an information inputting section to which a display instruction to display a setting image for assisting the change of the setting information is input, wherein the image generating section generates a second synchronizing signal different from the first synchronizing signal, and the control section controls the image generating section so that the image generating section outputs the setting image with the setting image superimposed on image data that is output in synchronization with the second synchronizing signal based on the digital signal in case the display instruction is input.

According to this application example, the image display device allows the user to input the setting information irrespective of signal degradation of a digital signal or waveform quality such as noise by displaying the setting image that assists the change of the setting information on an adjustment of the digital signal in synchronization with an appropriate synchronizing signal in case a display instruction is input to the information inputting section. This makes it possible to make an adjustment appropriately to the digital signal which is input via a digital signal cable.

According to another application example, the image display device makes an adjustment to the image data based on the digital signal, the adjustment based on the changed setting information, and outputs the adjusted image data in synchronization with the first synchronizing signal. This makes it possible for the user of the image display device to check easily whether or not the contents of change of the setting information are appropriate.

According to still another application example, the user of the image display device can change a set value of equivalent processing, which is so-called equalizing processing, performed on the digital signal while viewing a displayed adjusted image.

According to yet another application example, the output of a hot plug detect [Hot Plug Detect] signal is resumed after connection between an HDMI image output unit and the image display device is virtually disconnected by stopping the output of the hot plug detect signal after the setting information is changed. As a result, even when there is packet data that has been unsuccessfully acquired due to an unstable signal state, it is possible to reacquire the packet data after the setting information is changed.

In a method for displaying an image according to still yet another application example, an appropriate synchronizing signal is output during an adjustment made to the digital signal based on the setting information on an adjustment of the digital signal. This makes it possible to provide a method for displaying an image, the method that can display reliably the setting image that assists the input of the setting information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention in which the present invention is applied to a projector will be described with reference to the drawings. It should be understood that the embodiment described below is not meant to limit the scope of the invention claimed in the appended claims in any way, and all the configurations described in the embodiment are not always necessary as solving means of the invention claimed in the appended claims.

First Embodiment

Figure 1A:
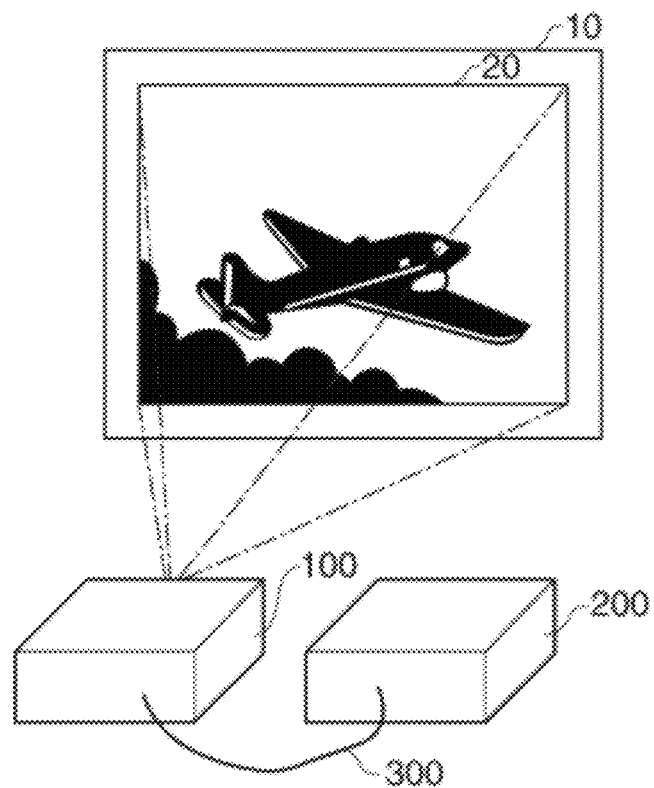
FIG. 1A is a diagram showing a projection status of a projector in a normal state in a first embodiment.
Figure 1B:
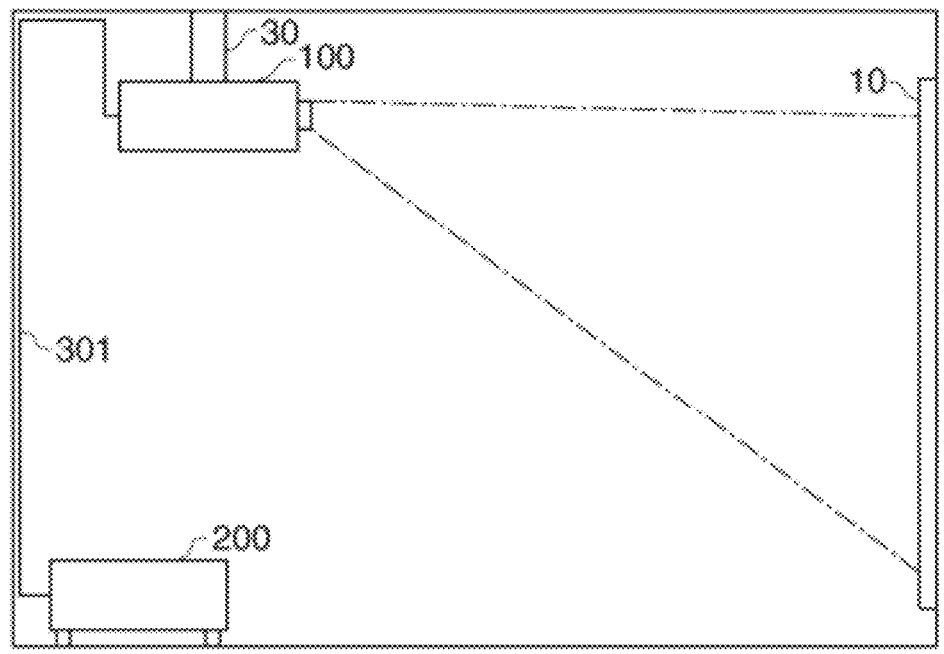
FIG. 1B is a diagram showing a projection status of the projector in a ceiling-hung state.
Figure 2A:
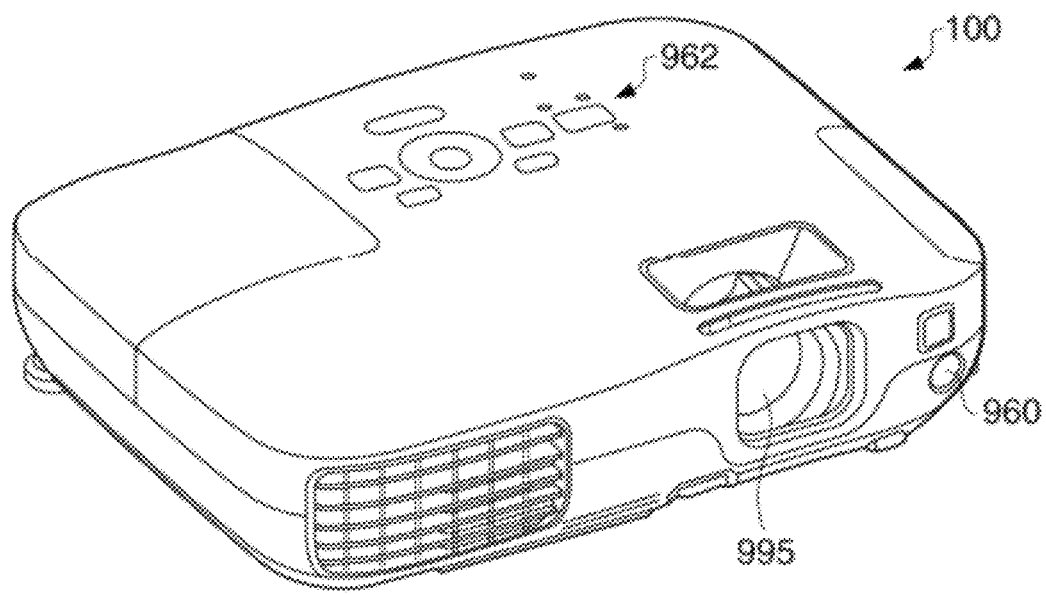
FIG. 2A is a perspective view of the projector in the first embodiment.

FIG. 1A is a diagram showing a projection status of a projector 100 in a normal state in a first embodiment. Moreover, FIG. 1B is a diagram showing a projection status of the projector 100 in a ceiling-hung state in the first embodiment. Furthermore, FIG. 2A is a perspective view of the projector 100 in the first embodiment, and FIG. 2B is a back view of the projector 100 in the first embodiment.

Figure 2B:
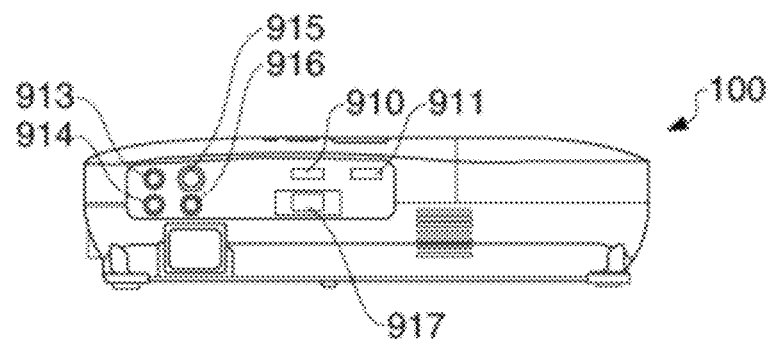
FIG. 2B is a back view of the projector.

As shown in FIG. 2B, for example, the projector 100 as an image display device has, on a back face thereof, HDMI terminals 910 and 911, sound input terminals 913 and 914, an S-video input terminal 915, a video input terminal 916, a mini D-Sub15pin terminal 917, and the like.

For example, as shown in FIG. 1A, the projector (the image display device) 100 is connected to a DVD player (an external device) 200 via an HDMI cable (a digital signal cable) 300 connected to the HDMI terminal 910 in a state in which the projector (the image display device) 100 is placed on a floor, a table, or the like, and projects an image 20 onto a screen 10 based on an image signal (a digital signal, such as an RGB signal, a luminance/color-difference signal, or a synchronizing signal) from the DVD player 200.

Moreover, in the ceiling-hung state shown in FIG. 1B in which the projector 100 is fixed to a ceiling by fittings 30, an HDMI cable 301 is longer than that in the normal state.

Furthermore, there are HDMI cables 300 and 301 with various types of quality and adaptive versions.

The projector 100 of the embodiment has the function of displaying a setting image 400 (see FIG. 6), which will be described later, by releasing a frame lock of an image generating section at the time of displaying the setting image 400 when the waveform quality of an image signal which is input to the projector 100 is deteriorated due to the lengths or quality of the HDMI cables 300 and 301 and controlling the image generating section by switching to a vertical synchronizing signal of a control section having a scaler function etc., the vertical synchronizing signal which is independent of a vertical synchronizing signal from a signal inputting section.

Figure 3A:
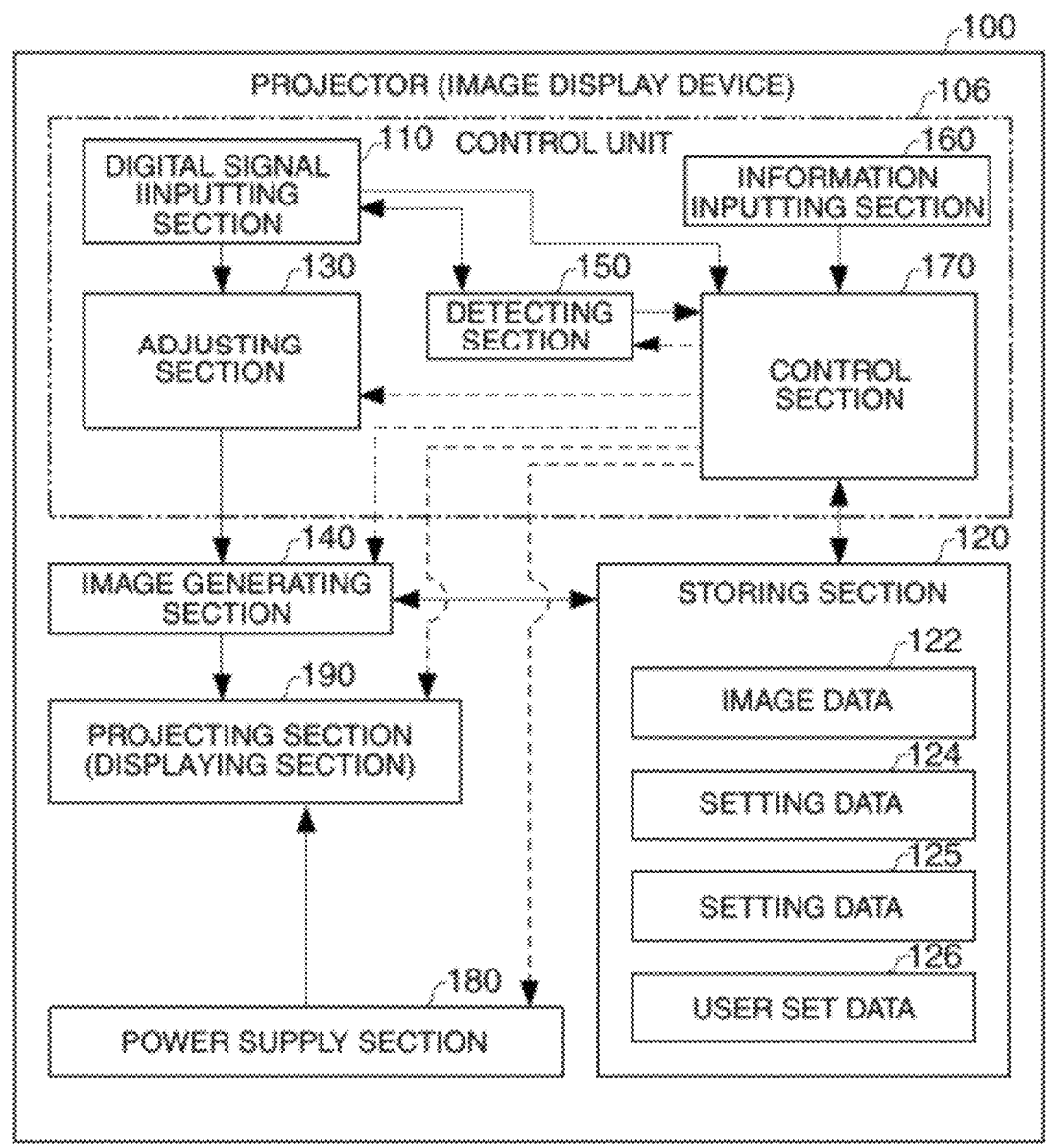
FIG. 3A is a functional block diagram of the projector in the first embodiment.

A functional block of the projector 100 will be described. FIG. 3A is a functional block diagram of the projector 100 in the first embodiment.

The projector 100 includes a digital signal inputting section 110 as a receiving section to which a digital image signal (a vertical synchronizing signal) is input via the HDMI cables 300 and 301 (see FIGS. 1A and 1B), an adjusting section 130 making an adjustment to the image signal, an image generating section 140 generating an image etc. based on the adjusted image signal, a projecting section (a displaying section) 190 projecting the image etc., and a power supply section 180 supplying power to the projecting section 190 etc.

Moreover, the projector 100 includes an information inputting section 160 to which operating information etc. from the user is input, a control section 170 controlling the adjusting section 130 etc., a detecting section 150 outputting a hot plug detect signal to the DVD player 200 (see FIGS. 1A and 1B), and a storing section 120.

Furthermore, the storing section 120 stores image data 122 for generating the setting image etc., setting data 124 and 125 indicating a set value of the adjusting section 130, user set data 126 indicating user settings, and the like. Incidentally, the digital signal inputting section 110, the adjusting section 130, the detecting section 150, the information inputting section 160, and the control section 170 also function as a control unit 106 that performs control of stopping the output of the hot plug detect signal after a change in the setting information is confirmed.

Figure 4:
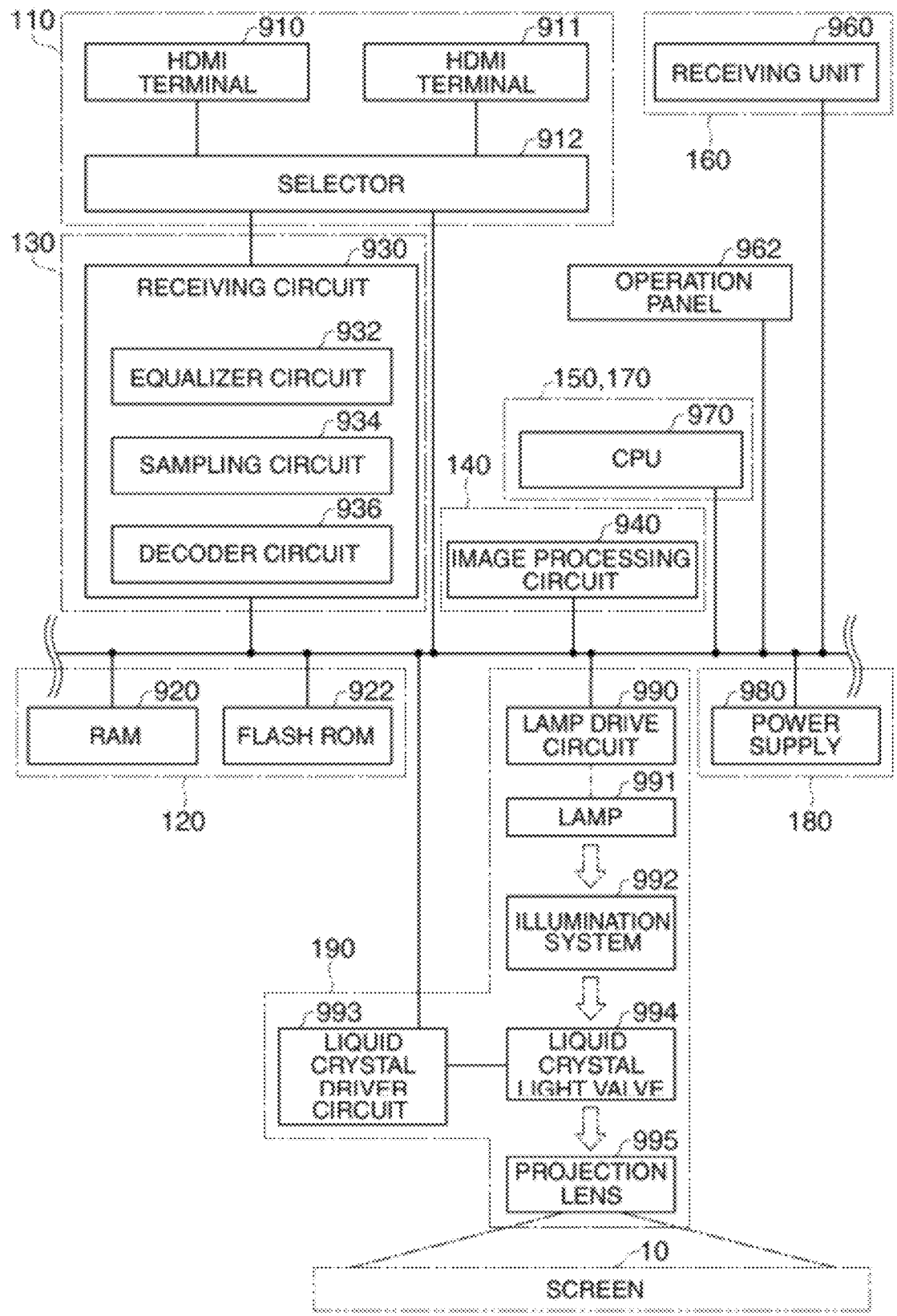
FIG. 4 is a hardware block diagram of the projector in the first embodiment.

FIG. 4 is a hardware block diagram of the projector 100 in the first embodiment and schematically shows the connection states of the individual sections. For example, the digital signal inputting section 110 may be implemented by using the HDMI terminals 910 and 911, a selector 912, and the like.

Moreover, the storing section 120 may be implemented by using RAM 920, flash ROM 922, and the like, and the adjusting section 130 may be implemented by using a receiving circuit 930 or the like including an equalizer circuit 932, a sampling circuit 934, a decoder circuit 936, and the like.

Furthermore, the image generating section 140 may be implemented by using an image processing circuit 940 or the like, the detecting section 150 and the control section 170 may be implemented by using a CPU 970 or the like, and the information inputting section 160 may be implemented by using a receiving unit 960 that receives an infrared signal from a remote controller (a remote control), an operation panel 962 formed of operation buttons etc., and the like.

The operation panel 962 and the remote control include arrow keys corresponding to up and down directions and right and left directions, an Enter key, etc. which are necessary for adjusting various setting items in the setting image, which will be described later, and making selections from the setting items.

Furthermore, the power supply section 180 may be implemented by using a power supply 980 or the like, and the projecting section 190 may be implemented by using a lamp driver circuit 990, a lamp 991, an illumination system 992, a liquid crystal driver circuit 993, a liquid crystal light valve 994, a projection lens 995, and the like. The lamp driver circuit 990 converts the power from the power supply 980 into drive power which is necessary for turning on the lamp 991, and outputs the drive power.

Incidentally, in FIG. 4, a power line which supplies power to the individual sections from the power supply 980 is omitted for ease of explanation. Moreover, only two HDMI terminals 910 and 911 are shown in FIG. 4; however, the projector 100 actually has other terminals such as the S-video input terminal 915. In addition, the HDMI terminals 910 and 911 may be provided as one HDMI terminal.

Figure 5:
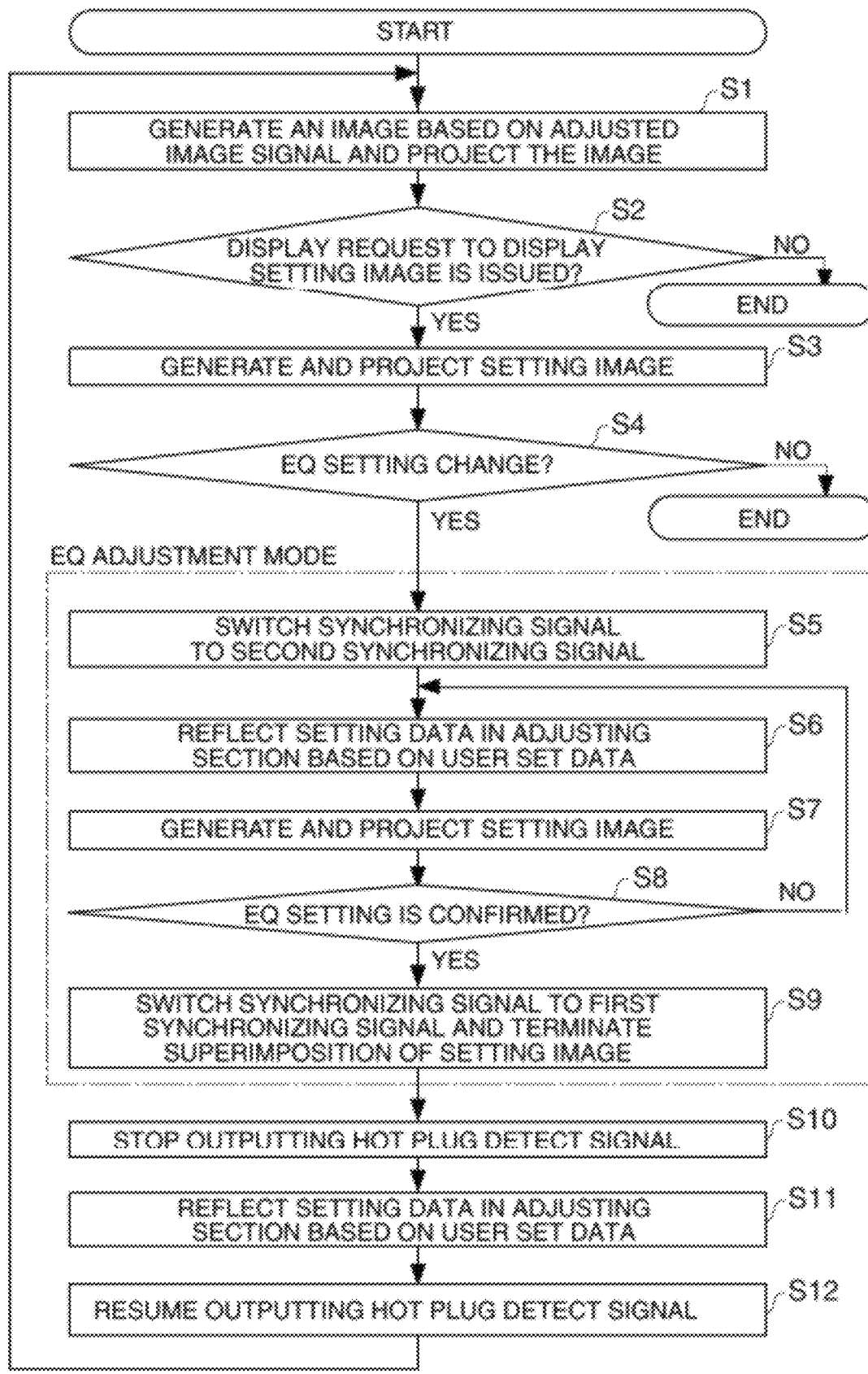
FIG. 5 is a flowchart showing an image display procedure in the first embodiment.

Next, an image display procedure in the embodiment will be described. FIG. 5 is a flowchart showing the image display procedure in the first embodiment.

The image generating section 140 generates an image 20 based on an image signal which has been adjusted by the adjusting section 130, and the projecting section 190 projects the image 20 (step S1).

If the user determines that there is noise in part of the projected image 20, for example, the user makes a setting image display request by operating the operation panel 962 of the projector 100 or the remote control (not shown).

The control section 170 determines whether a setting image display request is issued based on the information (the information on the display request made by the user) from the information inputting section 160 (step S2). If a setting image display request is not issued (step S2: NO), it means that display is performed normally. Therefore, the projector 100 ends the processing for initial control and performs normal image processing. If a setting image display request is issued (step S2: YES), a setting image based on the image data 122 is generated, and the projecting section 190 projects the setting image (step S3).

Figure 6:
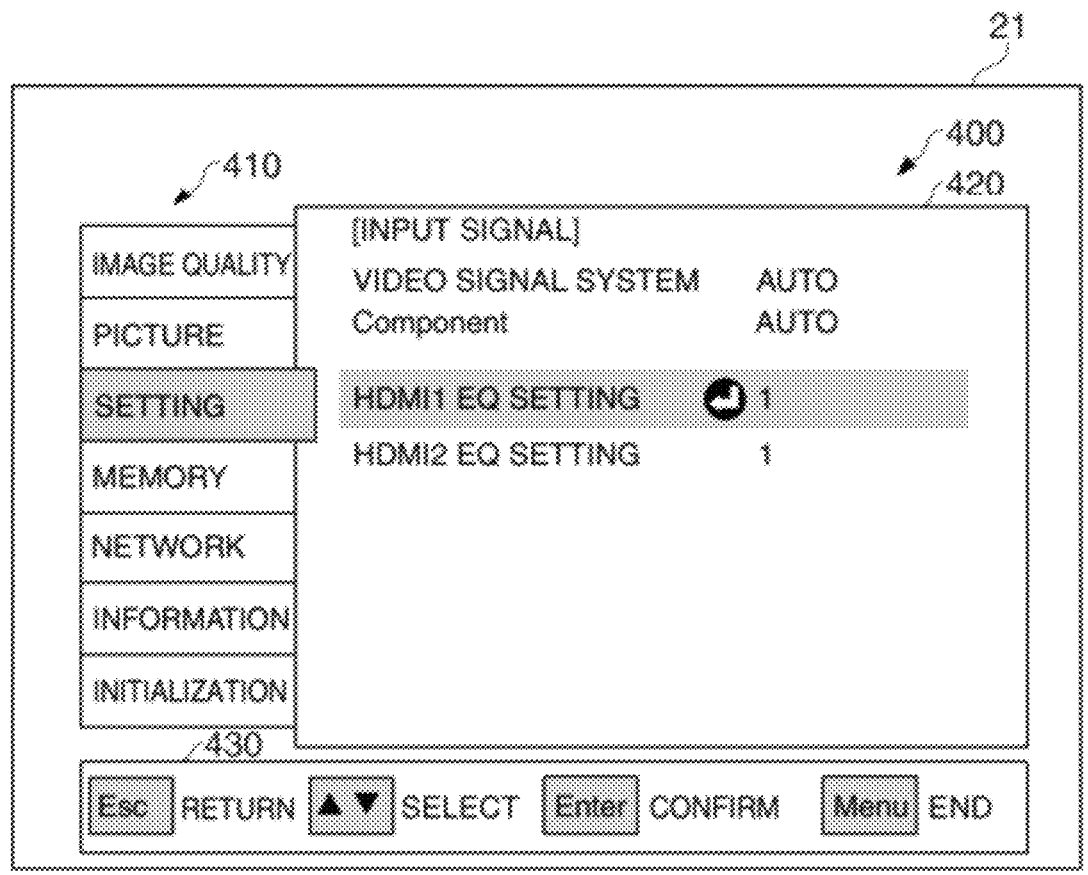
FIG. 6 is a diagram showing an example of a setting image in the first embodiment.
Figure 7A:
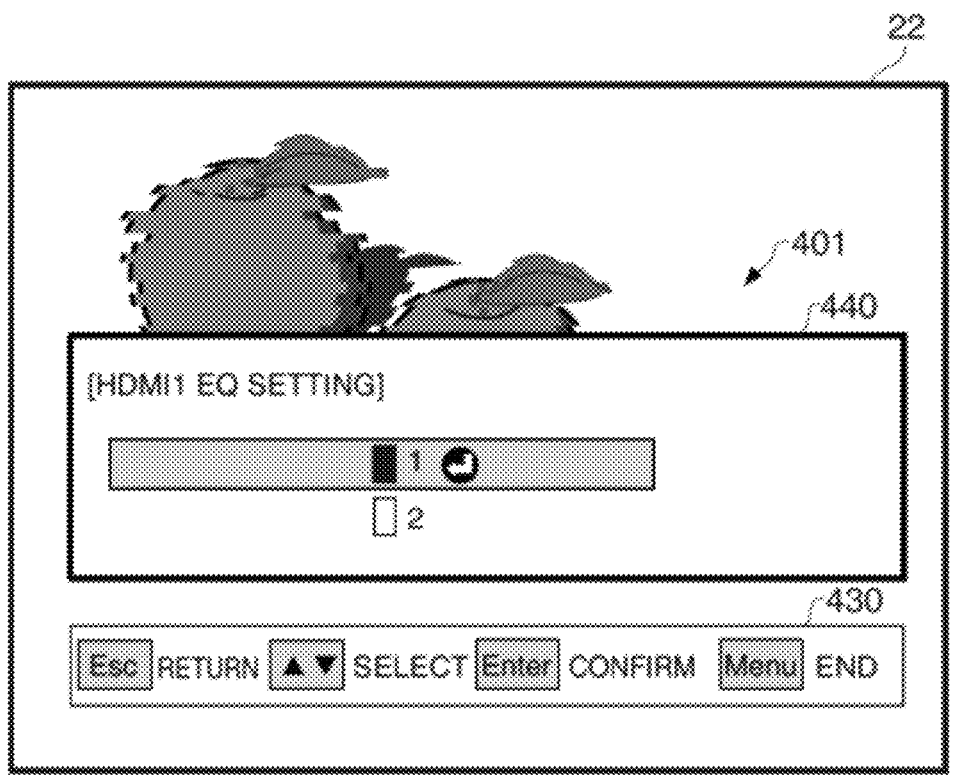
FIG. 7A is a diagram showing, as an example of the setting image in the first embodiment, a case in which inappropriate setting is selected.
Figure 7B:
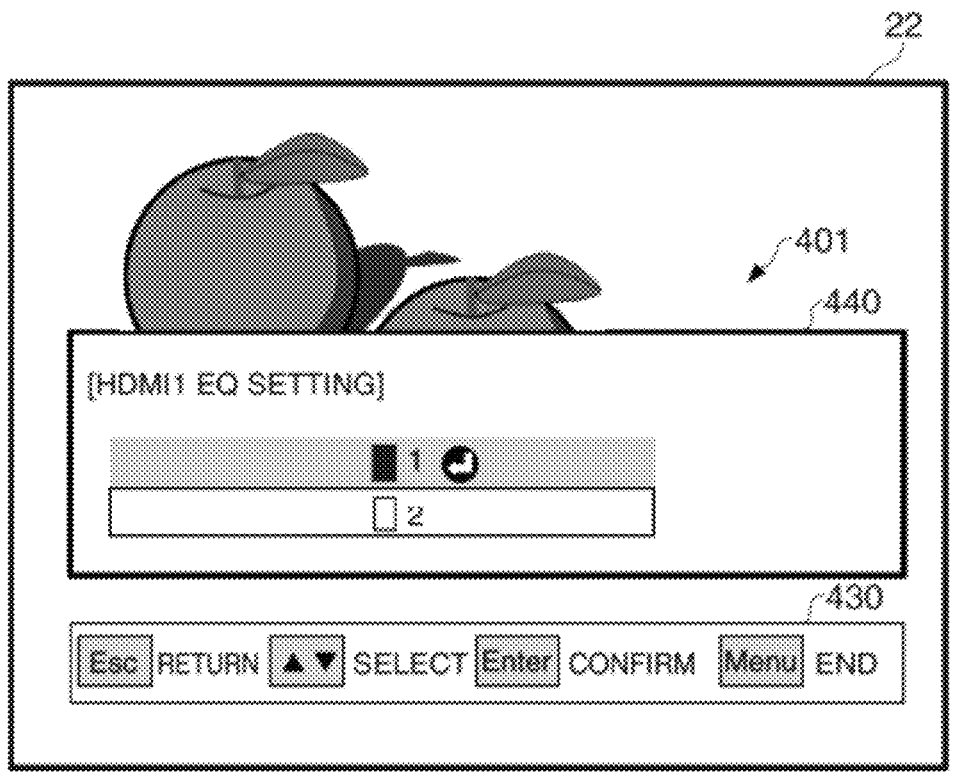
FIG. 7B is a diagram showing, as another example of the setting image, a case in which optimum setting is selected.

FIG. 6 and FIGS. 7A and 7B are diagrams showing examples of the setting images 400 and 401 in the first embodiment. The setting images 400 and 401 are images that accept the input of the information on the setting made by the user.

The setting image 400 shown in FIG. 6 includes a top menu image 410 formed as a menu including "image quality", "picture", "setting", "memory", "network", "information", and "initialization", a submenu image 420 which is related to an input signal and is displayed when "input signal" is selected in "setting", and an operation guide image 430 indicating the key operation performed on the operation panel 962 or the remote control and the content of a response to the key operation.

Figure 3B:
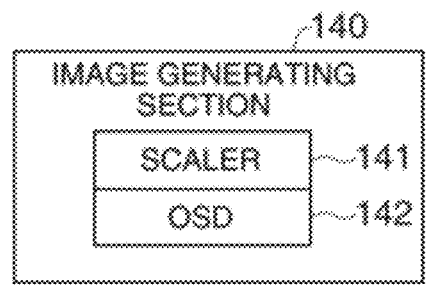
FIG. 3B is a functional block diagram of an image generating section 140.

Moreover, the setting image 401 shown in FIGS. 7A and 7B is a selection image that accepts the selection of the setting data 124 and 125 shown in FIGS. 3A and 3B. The setting image 401 is an image that is displayed when "HDMI1 EQ setting" or "HDMI2 EQ setting" is selected in the submenu image 420 of the setting image 400, and includes an equalizer setting screen 440 and the operation guide image 430.

Incidentally, the "HDMI1 EQ setting 1" indicates that setting 1 corresponding to the setting data 124 is selected as equalizer setting (an adjustment to a digital signal) for the input signal from the HDMI terminal 910, and "HDMI2 EQ setting 1" indicates that setting 1 corresponding to the setting data 124 is selected as equalizer setting for the input signal from the HDMI terminal 911.

For example, the user can change the equalizer setting for the HDMI terminal 910 to setting 2 by, for example, selecting setting 2 by pressing a downward arrow key of the operation panel 962 or the remote control in a state in which the setting image 401 shown in FIG. 7A or 7B is displayed and ending the display by pressing the menu key of the operation panel 962 or the remote control. Incidentally, the setting images 400 and 401 are OSD (on screen display) images. The setting image 400 is displayed as an OSD image of an image 21, and the setting image 401 is displayed as an OSD image of an image 22.

In FIG. 5, it is determined whether or not the equalizer (EQ) setting has been changed based on the image information from the setting image (step S4). If the equalizer (EQ) setting has not been changed (step S4: NO), it means that display is performed normally. Therefore, the projector 100 ends the processing for initial control and performs normal image processing.

When, although the measurement of the input signal can be performed in the digital signal inputting section 110, the signal is deteriorated due to an HDMI long cable or poor cable connection and a temporal distortion in the picture (bright spot noise, screen displacement, or snow) as shown in FIG. 7A occurs, the user operates the operation panel 962 or the remote control and thereby inputs a display instruction for displaying the setting image 401 that assists the change of the equalizer setting.

In FIG. 5, if the equalizer (EQ) setting has been changed (step S4: YES), when the control section 170 detects the input of the display instruction, the control section 170 controls the image generating section 140 so that the image generating section 140 outputs the setting image 401.

In a state in which the setting image 401 is displayed by the processing in step S4, the control section 170 switches a vertical synchronizing signal (a first synchronizing signal) from the receiving section to a vertical synchronizing signal (a second synchronizing signal) generated inside (step S5).

If the user selects any setting and the change of setting is performed in this state, the control section 170 updates the user set data 126 and reflects the data in the adjusting section 130 (step S6). Incidentally, the setting data is a gain value etc. in the equalizer circuit 932, for example.

As shown in FIG. 7B, the projecting section 190 projects the image 22 generated after the update of the user set data 126 with the setting image 401 superimposed on the image 22 (step S7).

In a state in which the setting image 401 is displayed, the control section 170 determines whether or not the change of the equalizer setting has been confirmed based on the information from the information inputting section 160 (step S8). If the equalizer setting has been confirmed (step S8: YES), the control section 170 switches the vertical synchronizing signal again from the second synchronizing signal to the first synchronizing signal from the receiving section, and terminates superimposition of the setting image 401 (step S9).

If the equalizer setting has not been confirmed (step S8: NO), the control section 170 goes back to step S6 and repeats the step.

Incidentally, no problem arises when YES is chosen in step S2 and the setting image 401 is displayed appropriately. However, there are cases where the setting image 401 is not displayed even when step S3 is performed. In such a case, when the operation panel 962 or the remote control is operated by the user, as in step S5, the first synchronizing signal from the receiving section is switched to the second synchronizing signal.

After updating the user set data 126, the control section 170 controls the detecting section 150 so as to stop outputting the hot plug detect signal (step S10). Incidentally, the hot plug detect signal is a signal complying with the HDMI standard and a signal which the projector 100 outputs in accordance with a power supply signal from the DVD player 200.

The control section 170 refers to the setting data 124 or the setting data 125 in accordance with the setting indicated by the user set data 126, reflects the data in the adjusting section 130, and makes the adjusting section 130 adjust an input image signal from the digital signal inputting section 110 (step S11).

After the setting data is reflected, the control section 170 controls the detecting section 150 so as to resume outputting the hot plug detect signal (step S12). Then, the procedure goes back to step S1.

Figure 8:
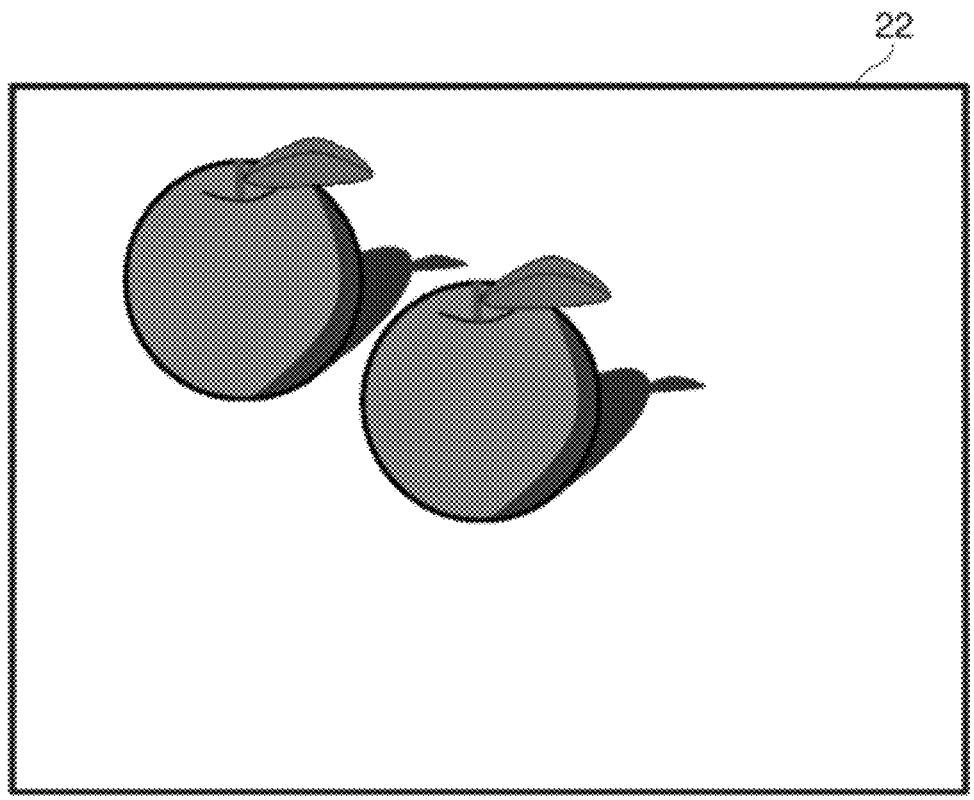
FIG. 8 is a diagram showing a state in which an image is projected based on an image signal whose setting has been confirmed, the image signal to which an adjustment has been made, as another example of the setting image in the first embodiment.

As a result, as shown in FIG. 8, the projector 100 urges the external device such as the DVD player 200 to output the image signal again, makes the adjusting section 130 adjust the input image signal based on the setting data 124 or the setting data 125 which is newly reflected in the adjusting section 130, generates the image 20 again, and projects the image 20. The above adjustment of the input image signal makes it possible to avoid HDCP (high-bandwidth digital content protection) false recognition in an unstable state at the time of adjustment, for example, and reacquire packet data etc. which could not be acquired before the adjustment of the equalizer.

As described above, according to this embodiment, when a request to change the equalizer setting is issued, the projector temporarily switches the vertical synchronizing signal from the vertical synchronizing signal (the first synchronizing signal) which has been acquired from the input digital signal to the second synchronizing signal generated inside, whereby the user can select optimum setting while viewing the result of the setting change.

Moreover, according to this embodiment, since the projector can display the setting image in response to a request from the user, even when the projector itself cannot determine whether or not appropriate display is performed, the projector can display an image which is appropriate for the user.

Furthermore, according to this embodiment, by displaying the setting image which allows the user to select setting and making the user make a selection, the projector can make an adjustment to the digital signal without an improper set value which may be set by the user. Moreover, according to this embodiment, the projector can appropriately make an adjustment to the digital signal by performing an equalizer adjustment.

In addition, according to this embodiment, even when HDMI cables of various lengths are connected to the projector, the projector can display an image by making adjustments appropriate for the lengths and quality of the cables. Moreover, according to this embodiment, the projector can make an adjustment in accordance with the characteristics of the HDMI terminal or the receiving circuit.

Other Embodiments

It is to be understood that application of the invention is not limited to the embodiment described above, and modifications are possible. For example, the digital signal cable is not limited to an HDMI cable, and may be a DVI (digital visual interface) cable or the like.

Moreover, the digital signal is not limited to an image signal, and may be a sound signal or a signal containing an image signal and a sound signal. Furthermore, the item which is set by the setting image is not limited to the setting of the equalizer circuit, and may be a parameter value or the like other than the equalizer circuit of the receiving circuit. In addition, a setting image that accepts the input of the parameter value or the like, the input performed by the user, may be adopted.

Moreover, the image display device is not limited to a projector, and may be, for example, a television, a liquid crystal monitor, and the like. Furthermore, the device in which the control unit is implemented is not limited to an image display device, and may be, for example, a hard disk recorder, a set-top box, an AV amplifier, and the like. In addition, the external device is not limited to a DVD player, and may be, for example, a hard disk recorder, a set-top box, a PC (personal computer), a game device, and the like.

Moreover, the computer of the projector may function as the control section 170 or the like by reading a program product stored in an information storage medium. As such an information storage medium, a CD-ROM, a DVD-ROM, ROM, RAM, and an HDD, for example, can be used.

Furthermore, the projector is not limited to a liquid crystal projector (a transmissive liquid crystal projector and a reflective liquid crystal projector such as LCOS) and may be, for example, a projector using a digital micromirror device. Moreover, the projecting section may adopt, in place of a lamp, an organic EL device, a silicon light-emitting device, and a self light-emitting device including a solid light source such as a laser diode or an LED. In addition, the function of the projector may be distributed among a plurality of devices (for example, a PC and a projector).

The entire disclosure of Japanese Patent Application No. 2011-11685, filed Jan. 24, 2011 is expressly incorporated by reference herein.

What is claimed is:

1. An image display device, comprising:
a receiving section that acquires an external vertical synchronizing signal superimposed on a digital signal which is input;
an image generating section that outputs image data based on the digital signal;
a control section that controls the image generating section so that the image generating section outputs the image data that is based on the digital signal in synchronization with the external vertical synchronizing signal;
an adjusting section that makes an adjustment to the digital signal based on setting information; and
an information inputting section to which a display instruction to display a setting image for assisting a change of the setting information is input,
wherein
the image generating section internally generates an internal vertical synchronizing signal, and
when the display instruction is input, the control section controls the image generating section so that the image generating section:
outputs the image data that is based on the digital signal in synchronization with the internal vertical synchronizing signal instead of the external vertical synchronizing signal, and
outputs the setting image such that the setting image is superimposed on a displayed image corresponding to the image data that is based on the digital signal that is output in synchronization with the internal vertical synchronizing signal,
following receipt of input directing a change of the setting information and prior to receipt of input confirming the change of the setting information, at least a portion of the displayed image is output so as to be visible when the setting image is superimposed on the displayed image.

2. The image display device according to claim 1, wherein in case the setting information is changed, the control section controls the image generating section so that the image generating section outputs the image data that is based on the digital signal in synchronization with the external vertical synchronizing signal.

3. The image display device according to claim 1, wherein the control section changes a set value of equalizer processing performed on the digital signal based on the setting information.

4. The image display device according to claim 1, wherein the receiving section is configured so as to receive a digital signal complying with the HDMI standard or the DVI standard, and
in case the change of the setting information is confirmed, the control section stops the output of a hot plug detect signal and then resumes the output of the hot plug detect signal.

5. The image display device according to claim 2, wherein the control section changes a set value of equivalent processing performed on the digital signal based on the setting information.

6. A method for displaying an image, comprising:
acquiring an external vertical synchronizing signal superimposed on a digital signal which is input;
outputting image data that is based on the digital signal in synchronization with the external vertical synchronizing signal;
making an adjustment to the digital signal based on setting information;

accepting the input of a display instruction to display a setting image for assisting a change of the setting information;
generating an internal vertical synchronizing signal;
when the display instruction is input:
   outputting the image data that is based on the digital signal in synchronization with the internal vertical synchronizing signal instead of the external vertical synchronizing signal, and
   outputting the setting image such that the setting image is superimposed on a displayed image corresponding to the image data that is based on the digital signal that is output in synchronization with the internal vertical synchronizing signal; and
following receipt of input directing a change of the setting information and prior to receipt of input confirming the change of the setting information, outputting at least a portion of the displayed image so as to be visible when the setting image is superimposed on the displayed image.

* * * * *